United States Patent
Paiva et al.

(10) Patent No.: US 9,723,940 B2
(45) Date of Patent: Aug. 8, 2017

(54) PROTECTIVE FILMS AND RELATED METHODS

(75) Inventors: Adriana Paiva, Richmond, TX (US); Jeffrey T. Anderson, Lake Elmo, MN (US); Roy Wong, White Bear Lake, MN (US); Susan K. Yarmey, Woodbury, MN (US); Mark A. Strobel, Maplewood, MN (US); Joel A. Getschel, Osceola, WI (US); Albert I. Everaerts, Oakdale, MN (US); Gregory F. King, Minneapolis, MN (US); John T. Brady, Lino Lakes, MN (US); Duane D. Fansler, Dresser, WI (US); Kanta Kumar, Maplewood, MN (US); Jeffrey D. Malmer, Mahtomedi, MN (US); Mario A. Perez, Burnsville, MN (US); Deborah A. Strobel, White Bear Lake, MN (US); Wendy L. Thompson, Roseville, MN (US); Michael C. Palazzotto, Woodbury, MN (US); Stefan H. Gryska, Woodbury, MN (US); Sharon Wang, St. Paul, MN (US); Mikhail L. Pekurovsky, Bloomington, MN (US); Mark F. Ellis, St. Paul, MN (US); Edward G. Stewart, Zimmerman, MN (US); Robert M. Jennings, Shoreview, MN (US); Gerald R. A. Hofmann, Oakdale, MN (US); Kelly J. Gibbens, Vadnais Heights, MN (US); Gezahegn D. Damte, Cottage Grove, MN (US); Jie Yang, Woodbury, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 1308 days.

(21) Appl. No.: 11/576,961
(22) PCT Filed: Oct. 12, 2005
(86) PCT No.: PCT/US2005/036516
§ 371 (c)(1),
(2), (4) Date: Apr. 10, 2007
(87) PCT Pub. No.: WO2006/044375
PCT Pub. Date: Apr. 27, 2006

(65) Prior Publication Data
US 2009/0053448 A1 Feb. 26, 2009

Related U.S. Application Data

(60) Provisional application No. 60/617,754, filed on Oct. 12, 2004.

(51) Int. Cl.
*E04F 15/02* (2006.01)
*A47G 27/02* (2006.01)
(Continued)

(52) U.S. Cl.
CPC .......... *A47G 27/0206* (2013.01); *C08J 7/047* (2013.01); *C09J 7/0296* (2013.01); *E04F 15/02* (2013.01);
(Continued)

(58) Field of Classification Search
CPC ... A47G 27/0206; C08J 7/047; C08J 2323/08; C08J 2367/02; C08J 2475/00;
(Continued)

(56) References Cited

U.S. PATENT DOCUMENTS 2,795,820 A 6/1957 Grow et al.
RE24,906 E 12/1960 Ulrich
(Continued)

FOREIGN PATENT DOCUMENTS

EP 1 004 608 5/2000
EP 1 460 045 9/2004
(Continued)

OTHER PUBLICATIONS

Cramm, R.H., and Bibee, D.V., "The Theory and Practice of Corona Treatment for Improving Adhesion", U.S. Defensive publication H 688, Oct. 1989, vol. 65, No. 8, pp. 75-78.
(Continued)

*Primary Examiner* — Nicholas Kokkinos
(74) *Attorney, Agent, or Firm* — Emily M. Van Vliet

(57) ABSTRACT

A protective film includes a base layer and a wear layer, the wear layer comprising a UV cured hardcoat resin, and the UV cured hardcoat resin comprising surface modified silica nanoparticles. The protective film may comprise a pressure sensitive adhesive for adhesion to a floor. The protective film may be used, for example, as a protective floor finish.

21 Claims, 8 Drawing Sheets

(51) Int. Cl.
 *C08J 7/04* (2006.01)
 *C09J 7/02* (2006.01)

(52) U.S. Cl.
 CPC ........ *C08J 2323/08* (2013.01); *C08J 2367/02* (2013.01); *C08J 2475/00* (2013.01); *C09J 2201/162* (2013.01); *Y10T 428/1452* (2015.01); *Y10T 428/31797* (2015.04)

(58) Field of Classification Search
 CPC .... C09J 7/0296; C09J 2201/162; E04F 15/02; Y10T 428/31797; Y10T 428/1452
 See application file for complete search history.

(56) References Cited

U.S. PATENT DOCUMENTS

| | | | |
|---|---|---|---|
| 3,153,683 A | | 10/1964 | Bryan et al. |
| 3,578,622 A | | 5/1971 | Brown et al. |
| 3,639,134 A | | 2/1972 | Stegmeier et al. |
| 4,364,981 A | * | 12/1982 | Horner et al. ............... 428/35.2 |
| 4,717,516 A | | 1/1988 | Isaka et al. |
| 5,213,872 A | * | 5/1993 | Pricone et al. ............ 428/195.1 |
| 5,244,780 A | | 9/1993 | Strobel et al. |
| 5,516,236 A | * | 5/1996 | Williams et al. ............. 405/216 |
| 5,643,669 A | * | 7/1997 | Tsuei ............................ 428/354 |
| 5,753,754 A | | 5/1998 | Strobel et al. |
| 5,939,182 A | * | 8/1999 | Huang et al. ................. 428/323 |
| 6,200,666 B1 | * | 3/2001 | Christian et al. .......... 428/195.1 |
| 6,461,709 B1 | * | 10/2002 | Janssen et al. ............... 428/41.7 |
| 2003/0044600 A1 | | 3/2003 | Okuyama |
| 2006/0003178 A1 | | 1/2006 | Strobel et al. |

FOREIGN PATENT DOCUMENTS

| | | |
|---|---|---|
| JP | 2001-105541 | 4/2001 |
| JP | 2001-220886 | 8/2001 |
| JP | 2001-240774 | 9/2001 |
| JP | 2001-287208 | 10/2001 |
| JP | 2001-295454 | 10/2001 |
| WO | WO 95/11333 | 4/1995 |
| WO | WO 98/11154 | 3/1998 |
| WO | WO 99/29794 | 6/1999 |
| WO | WO 99/64239 | 12/1999 |
| WO | WO 01/28769 | 4/2001 |
| WO | WO 03/049942 | 6/2003 |
| WO | WO 2005/035241 | 4/2005 |
| WO | WO 2005/068195 | 7/2005 |

OTHER PUBLICATIONS

U.S. Appl. No. 11/571,055, Paiva, filed Jun. 30, 2005.
U.S. Appl. No. 60/617,904, Paiva, filed Oct. 12, 2004.
U.S. Appl. No. 60/617,896, Wilhelm, filed Oct. 12, 2004.
U.S. Appl. No. 60/617,951, Paiva, filed Oct. 12, 2004.

* cited by examiner

PROTECTIVE FILMS AND RELATED METHODS

CROSS REFERENCE TO RELATED APPLICATIONS

This application is a national stage filing under 35 U.S.C. 371 of PCT/US2005/036516 filed Oct. 12, 2005, which claims priority to U.S. Provisional Application No. 60/617,754; filed Oct. 12, 2004, the disclosure of which is incorporated by reference in its/their entirety herein.

FIELD OF THE INVENTION

The present invention relates to a protective film, specifically a protective floor film system, and methods for making and applying the film. More particularly, the invention relates to a floor film having a protective wear layer.

BACKGROUND

A variety of floor care systems have been developed to protect, enhance the appearance, and increase the usable life span of floor substrates, such as vinyl, marble, terrazzo, ceramic, linoleum, wood, etc. Most conventional floor care systems involve the use of a finishing composition applied to the surface of the floor. Floor finishes are typically maintained with the use of cleaners and tools, such as buffing or burnishing machines, mops, and the like, and must be periodically re-applied to the floor surface as they are worn away with time and foot traffic. Although such systems can be very effective, they can also be expensive to maintain. Additionally, if a floor finish system is not properly maintained, the floor itself may eventually become worn or unsatisfactory over time, making it necessary to entirely remove and replace the floor substrate.

Conventional floor finish systems often employ polymer-based floor coatings. Such finishes are typically applied with a mop as an aqueous emulsion or solvent solution that dries to a hard protective film. After prolonged exposure to foot traffic, such finishes become scratched, scuffed and soiled and eventually need replacing. The removal of these coatings from hard floors is typically accomplished through the use of chemical solutions, such as mixtures of alkalis and volatile solvents. These compositions are generally unpleasant and messy to use. In recent years, more durable floor care systems have been developed utilizing highly crosslinked coatings, such as UV-cured urethanes, polyurethane dispersions and epoxies. However, the highly crosslinked nature of these durable films can make them difficult to remove by any means other than physical abrasion.

SUMMARY OF THE INVENTION

The present invention features protective film constructions that include a base film layer and a wear layer disposed on at least a portion of the base film layer. The base film layer may be stretchable or stiff. In addition, the film may optionally contain an adhesive layer (e.g. a pressure sensitive adhesive) disposed on at least a portion of the base film layer, and may also have a release liner disposed on at least a portion of the adhesive layer.

In various embodiments of the invention, the base film layer has a thickness of about 0.5 to about 100 mils, more typically about 0.5 to about 50 mils, and most typically about 1 to about 10 mils.

The wear layer may be conformable or stiff. Typically a conformable wear layer is used with a stretchable base film layer. When a stiff base film layer is used, the wear layer can be either stiff or conformable.

The surface of the base film layer that contacts the wear layer may be primed or surface-treated to increase the adhesion of the base film layer to the wear layer. The surface of the base film layer that contacts the adhesive layer may also be primed or surface-treated to aid adhesion. Suitable surface treatments include, but are not limited to, air corona treatment, nitrogen corona treatment, nitrogen corona treatment at elevated film temperature, flame treatments, plasma treatment and chemical priming.

The base film layer typically comprises a transparent polymer. In one embodiment, the polymer of the base film layer is an ionomeric blend. In an alternative embodiment, the base film layer can be polyethylene terephthalate (PET).

The wear layer typically comprises a UV cured hardcoat resin layer. In one embodiment, the wear layer comprises a polyurethane acrylate and a plurality of surface modified inorganic particles having a mean diameter in a range from 1 to 200 nanometers. In an alternative embodiment, the wear layer comprises a polyacrylate and a plurality of surface modified inorganic particles having a mean diameter in the range from 1 to 200 nanometers.

In addition, the wear layer may optionally contain additives, such as fluorochemicals, silicones and silicone acrylates, that improve the surface properties, e.g. soil resistance, black mark resistance, etc., of the film.

Other features and advantages of the present invention will be apparent from the following detailed description thereof, and from the claims.

DEFINITIONS

As used herein, the term "stretchable" describes film materials that are characterized in that the force required to stretch the film as measured in accordance with ASTM standard D882-02 at 2% elongation divided by the sample width is about 5 lb/in or less.

By "conformable" is meant having an elongation to crack value of at least 5% and a Taber abrasion % haze change value at 1000 cycles of 30% or less at room temperature.

By "stiff base filth layer" is meant that the base film layer is not stretchable.

By "stiff wear layer" is meant that the wear layer has an elongation to crack value of no more than about 5% and a Taber abrasion % haze change value at 1000 cycles of 30% or less, more typically 20% or less, most typically 15% or less at room temperature.

By "mil" is meant one-thousandth of an inch.

The term "polymer" will be understood to include polymers, copolymers (e.g., polymers formed using two or more different monomers), oligomers and combinations thereof, as well as polymers, oligomers, or copolymers that can be formed in a miscible blend or as multilayer constructions.

The terms "base film layer" and "hacking" are used interchangeably herein.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a" "an", and "the" also include the plural forms unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties such as modulus and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

DETAILED DESCRIPTION

The present invention features a variety of different film constructions that have good durability and soil resistance and may be applied to a floor surface to provide protection and improve the appearance of the floor. The film constructions include wear layers, which may range from stiff to conformable, coated over a base film layer or backing, which may be stretchable, conformable or stiff.

Figure 1A:
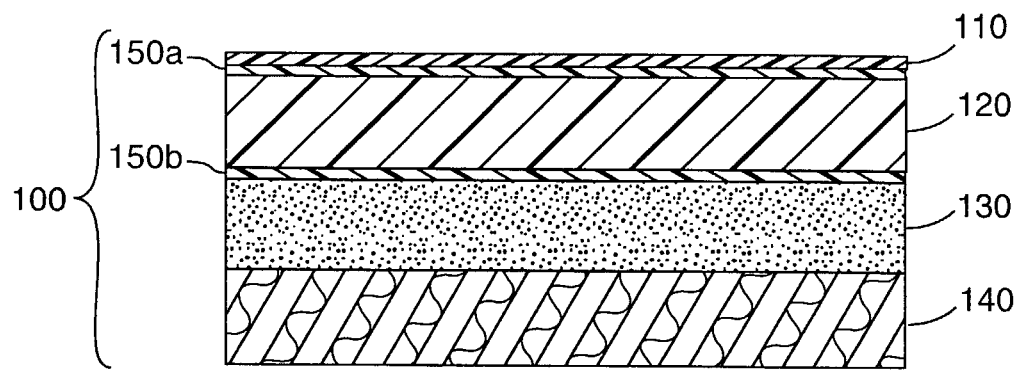
FIG. 1 is a schematic diagram showing a cross sectional view of a protective floor film according to the invention with a release liner (a) and after lamination to a floor surface (b).
Figure 1B:
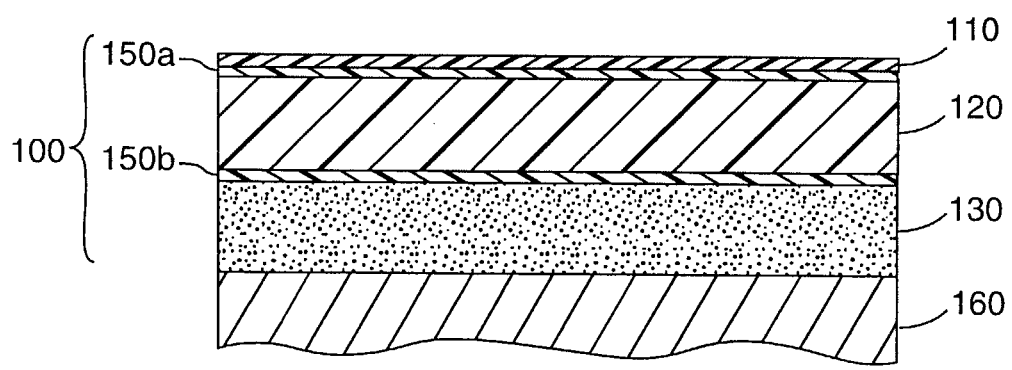

FIG. 1 depicts a typical floor film 100 of the present invention, including a wear layer 110, a backing or base film layer 120, an optional adhesive layer 130, and an optional release liner 140. The wear layer 110 typically provides the film 100 with gloss retention, scratch resistance, soil and stain resistance, black mark resistance, and other surface properties as desired. The backing 120 typically provides the film 100 with physical integrity and conformability to the floor substrate 160.

A priming layer 150a or surface treatment is typically used for adhesion of the wear layer 110 to the backing 120. The choice of primer or surface treatment can have a substantial influence on film performance. A priming layer 150b or surface treatment is also typically used for adhesion of the adhesive layer 130 to the backing 120. The adhesive layer 130 should generally have a sufficient level of adhesion to the film to prevent failure of the adhesive/backing interface and avoid transfer of the adhesive to the floor. The adhesive layer 130 typically provides adhesion to the floor with clean removability after service time, and should generally have enough adhesion so that overlap adhesion and splice gapping can be maintained while minimizing peel force and adhesion build. Also, in certain implementations it is desirable for the adhesive layer 130 to have low release from the release liner so that minimum power is required for the applicator.

The flooring substrate 160 can be any suitable flooring material. A partial listing of flooring materials include, for example, vinyl, marble, terrazzo, ceramic, linoleum, wood, metal, plastic, rubber, concrete, stone, vinyl composition tile, and glass.

Although the film constructions of the invention are particularly well suited for use as a protective coating for floor substrates, these films may also be used as coatings on other substrates as well. Examples of other substrates onto which the films of the invention may be applied include, but are not limited to, whiteboards, countertops, walls, ceilings, patios, shelves, stairs, sidewalks, roads, driveways, tabletops, dry-erase boards, parking lots, windows, and the like.

Backing and Surface Treatment

The base film layer 120 may be made from any material suitable for providing a protective layer on an underlying flooring substrate 160. For example, a myriad of polymer materials are suitable for use in base film layer 120. In some implementations, the base film layer 120 includes a polymer, typically a transparent polymer. Examples of suitable polymer films include, but are not limited to, polypropylene films, polyacetal films, polyamide films, polyester films, polyolefin films, polystyrene films, polyvinyl chloride films, polyvinylidene chloride films, polyurethane films, polyurea films, and the like. In one embodiment of the invention, the polymer film used as a backing material includes a polyethylene terephthalate (PET). In an alternative embodiment, the polymer film includes an ionomeric blend available under the tradename "SURLYN®" (E. I. du Pont de Nemours and Company, Wilmington, Del.).

The thickness of the base film layer 120 can be any useful thickness. Typically, the base film layer 120 has a thickness of about 0.5 to about 100 mils. More typically, the base film layer 120 has a thickness of about 0.5 to about 50 mils. Most typically, the base film layer 120 has a thickness of about 1 to about 10 mils.

The selection of the backing 120 as well as the surface treatment can affect the final performance of the floor film. One of the challenges of applying a protective floor film is that floors are often not level and have undulations in both the down aisle and cross aisle directions. This can lead to imperfections in the film, such as wrinkles, "tenting" of the film over low areas or in between high spots in the floor, and clarity problems. In certain implementations of the invention, such defects are avoided or minimized by utilizing a film construction having a conformable or stretchable backing coated with a conformable wear layer.

Conformable backings can be described as having low modulus values. Some of the advantages of using a conformable or stretchable film include: avoidance of "tenting"; good steerability, which allows alignment of the film without wrinkles; and good wetting of the adhesive to the floor so as to look substantially clear. One of the surprising aspects of the present invention is that it is possible to provide a protective floor film having good wear properties by combining a low modulus or stretchable backing with a conformable wear layer. It is also surprising that a conformable or stretchable backing with a conformable hard coating has about the same gloss retention after exposure to foot traffic as a non-conformable backing with a hard coating.

Accordingly, in one embodiment of the invention, the backing 120 is a conformable or stretchable backing. Alternatively, in other embodiments, the backing may include a relatively stiff material. Suitable backing materials include, but are not limited to, simultaneously biaxially oriented polypropylene (SBOPP), biaxially oriented polypropylene (BOPP), polyethylene terephthalate (PET), polyvinyl chloride (PVC), monoaxially oriented polypropylene (MOPE), polyethylene terephthalate glycolate ((PETG), olefins, biaxially oriented polyethylene terephthalate (BOPET) and SURLYN™. Other suitable polymers for use in the base film layer include, but are not limited to, metallocene polyolefins, ethylene vinyl acetates, other ionomer resins and compatible blends. in addition, multilayer constructions could also be used as long as they provide films that can follow the contours of the floor during application. Typically, a conformable backing layer is matched with a conformable wear layer to provide a film having enhanced wear properties.

The surface modification of polymer articles to improve the wetting, coating, or adhesion properties of those articles is well known in the art. Such surface treatments may be useful to secure adhesion between the base film layer 120 and the adhesive layer 130 or the wear layer 110. Surface treatments useful for such purposes include, for example, chemical priming, atmospheric-pressure dielectric-barrier discharges (corona treatment), and flame treatment.

As used herein, atmospheric-pressure dielectric-barrier discharges refer generally to any process in which active gas-phase species (such as free radicals, ions, or electrically or vibrationally excited states) are produced by electron impact with gaseous molecules. Atmospheric-pressure dielectric-barrier discharges as used herein are also known by many other terms. These terms include but are not limited to coronas, corona discharges, barrier discharges, atmospheric-pressure plasmas, atmospheric-pressure glow discharges, atmospheric-pressure nonequilibrium plasmas, silent discharges, atmospheric-pressure partially ionized gases, filamentary discharges, direct or remote atmospheric-pressure discharges, externally sustained or self-sustained atmospheric-pressure discharges, and the like. Atmospheric-pressure dielectric-barrier discharges can be sustained in various gaseous atmospheres, such as air, substantially nitrogen, substantially helium, or mixtures of helium and nitrogen.

Atmospheric-pressure nitrogen dielectric-barrier discharges ("nitrogen coronas") are broadly known in the art, as described, for example, in U.S. Pat. No. 3,639,134 (Stegmeir et al.); in U.S. Pat. No. 4,717,516 (Isaka and Nagano); and in U.S. Statutory Invention Registration No. 1-1688 (Sobataka and Wolfe). Nitrogen-corona processes are described in U.S. Pat. No. 5,244,780 (Strobel et al.) and in U.S. patent application Ser. No. 10/883,263, filed on Jul. 1, 2004.

The flame treatment of polymeric articles is also broadly known in the art. Typical flame treatments of film as practiced in industry are described in U.S. Pat. No. 5,753,754 (Strobel et al.). Flame treatment is also disclosed in many other patents, for example, in U.S. Pat. No. 2,795,820 (Grow) and U.S. Pat. No. 3,153,683 (Bryan and Swarts).

A chemical primer or a corona or flame treatment can be optionally disposed between the base film layer 120 and the adhesive layer 130. A chemical primer or corona or flame treatment can also optionally be disposed between the base film layer 120 and the wear layer 110. Typically, inter-layer adhesion between the base floor film layer 120 and the adhesive layer 130 and/or wear layer 110 is enhanced when a chemical primer and/or corona or flame treatment is employed Suitable chemical primers may be selected from urethanes, silicones, epoxy resins, vinyl acetate resins, ethyleneimines, and the like. Examples of chemical primers for vinyl and polyethylene terephthalate films include crosslinked acrylic ester/acrylic acid copolymers disclosed in U.S. Pat. No. 3,578,622. The thickness of the chemical primer layer is generally within the range of 10 to 3,000 nanometers (nm).

As with chemical primers, corona treatment can also improve the inter-layer adhesion between the floor film layer 120 and the adhesive layer 130 and/or the wear layer 110. Corona treatment of films is a well-known technique, and is described generally in Cramm, R. H., and Bibee, D. V., The Theory and Practice of Corona Treatment for Improving Adhesion, TAPPI, Vol. 65, No. 8, pp 75-78 (August 1982), and in U.S. Defensive publication H 688, published Oct. 3, 1989.

The choice of surface treatment can substantially affect the degree of adhesion of the wear layer 110 and the adhesive layer 130 to the backing 120. Most typically, the surface treatments used for this invention include, air corona, nitrogen corona, nitrogen corona at elevated film temperature, flame treatments, plasma and chemical priming. Surface treatment of SBOPP, BOPP. PET, and SURLYN® backings are described in more detail in the Examples section below.

The surface treatment and energy level of the base film layer can also affect final performance of the film as whole. Some of the affects of surface treatments such as air corona, nitrogen corona, nitrogen corona at elevated film temperature, flame treatment and plasma treatment on BOPP and SBOPP films are described in the Examples section below. Results indicate that Taber abrasion is generally not affected by the type of surface treatment selected or the energy level for nitrogen corona; however, surface treatment does have an effect on Taber abrasion as compared to non-surface treated films and #2 bond failure values decrease to levels that will cause adhesive transfer to the floor as the energy level is decreased from 1.7 to 0.25 $J/cm^2$.

Wear Layer

Different technologies may be used for the wear layer 110 of the film 100. Typically, the wear layer 110 includes a cured resin layer made from any suitably curable polymeric material. For example, films may be top coated at different thicknesses with acrylates, epoxies, urethane acrylates with and without silica, nanosilica, and/or different particle/nanoparticle functionalization. More details regarding suitable material for use in the wear layer are described in U.S. patent application Ser. No. 11/576,951, entitled "Protective Film Hardcoat", which is filed on even date herewith (Oct. 12, 2004).

Typically a conformable wear layer is used in combination with a conformable backing; however, in certain implementations it may be desirable to use a conformable wear layer with a stiff backing. More commonly, however, a stiff backing is combined with a stiff wear layer.

Certain surface properties of the wear layer, such as soil resistance, black mark resistance, etc., can be improved with a minimal effect on the overlap adhesion through the use of fluorochemical additives incorporated into the wear layer.

More details regarding the use of fluorinated additives in wear layers is described in U.S. Ser. No. 60/585,460, filed on Jul. 1, 2004.

Adhesive Layer

Any suitable adhesive composition can be used in the adhesive layer 130 of the film 100. In general, the adhesive layer 130 of the film should exhibit sufficient adhesion to the film such that #2 bond failure will not occur under operational conditions and transfer of the adhesive to the floor will be avoided. Additionally, the adhesive layer should generally provide enough adhesion so that overlap adhesion and splice gapping can be maintained. Moreover, the film should generally exhibit low release from the release liner so that minimum power is required for the applicator. Other advantageous characteristics of an adhesive layer include: optical clarity; non-yellowing upon aging; non-staining to the substrate; little or no adverse effect on the appearance of the substrate it protects; clean removability from the substrate after several months or years of contact (i.e., the adhesion cannot build excessively to a wide variety of substrates); good wetting of the substrate; plasticizer resistance (or at least tolerance); and resistance to moisture, mildew, detergents, water, and the like.

In one implementation of the invention, adhesive layer 130 includes a pressure sensitive adhesive (PSA), such as an acrylic pressure sensitive adhesive (PSA) having an inherent viscosity in a range of 0.3 to 2.0 dl/g, a cross-linker, and a plasticizer compatible with the acrylic pressure sensitive adhesive. Acrylic PSAs generally include a primary component of acrylate or methacrylate monomer or a combination of such monomers which, when polymerized, have a low glass transition temperature (Tg) and a low modulus (i.e. they are rubbery and soft). These soft, tacky low Tg monomers can be copolymerized with a secondary component consisting of high Tg monomers, usually polar monomers such as acrylic acid, methacrylic acid, itaconic acid, acrylamide, methacrylamide, and mixtures thereof. As is described in U.S. Pat. No. Re 24,906. When such polar monomers are incorporated with a predominance of low Tg monomers, a sufficiently tacky pressure-sensitive adhesive is formed having high cohesive or internal strength. Further increase in internal or cohesive strength (i.e., shear strength) can be obtained via cross-linking.

The adhesive layer 130 can have any useful thickness. In some implementations, the adhesive layer 130 has a thickness of 25 to 75 micrometers, or from 25 to 50 micrometers. More details regarding suitable materials for use in the adhesive layer are described in U.S. patent application Ser. No. 11/576,962, entitled "Protective Film Adhesive", filed on even date herewith (Oct. 12, 2004).

Release Liner

The protective floor film of the invention can optionally include one or more additional layers, including, for example, a release liner 140. A release liner 140 can optionally be disposed on the adhesive layer 130 prior to laminating the protective floor film 100 onto the flooring substrate 190. Thus, the adhesive layer 130 can be disposed between the release liner 140 and the base film layer 120. The release liner 140 can be formed of any useful material such as, for example, polymers or paper and may include a release coat (not shown). Suitable materials for use in release coats are well known and include, but are not limited to, fluoropolymers, acrylics and silicones designed to facilitate the release of the release liner from the pressure sensitive adhesive. The release coat may be designed to remain substantially adhered to the release liner after the transfer of the film to the surface to be finished.

The selection of the appropriate material for the release liner 140 can affect the clarity of the film as well as the weight and ease of handle of the roll of film to apply on the floor. The liner's pattern and roughness can have an impact on the wetting and optical characteristics of the applied product because this pattern is transferred to the adhesive as the liner is removed.

Application of Film to Substrate Surface

The protective film 100 can be laminated onto the flooring substrate 160 at any convenient rate. Typically, the protective film 100 is laminated onto the flooring substrate 160 at a rate between about 0.005 meters per second and about 0.5 meters per second.

The protective film 100 can also be delaminated or removed from the flooring substrate 160 at any convenient rate. Typically, the protective film 100 is delaminated from the flooring substrate 160 at a rate between about 0.005 meters per second and about 0.5 meters per second.

One apparatus that can be used to apply film on the floor is described in U.S. patent application Ser. No. 11/576,956, entitled "Film Lamination Vehicles and Method", filed on even date herewith (Oct. 12, 2004). The apparatus described therein is designed such that three different lamination modules—a rubber covered roll, a uniformly loaded flexible squeegee and a segmented roll—can be easily switched in and out. Steering of the machine is done through a differential servo drive. The two main drive wheels are independently servo driven. The ratio of speed between the two wheels can be precisely controlled to achieve tank or skid loader style steering. The unwind tension and liner rewind tension are manipulated to control final appearance of the floor, and to avoid wrinkles as well as film and product damage.

The apparatus is propelled with two precisely speed controlled driven wheels. Minute operator controlled differences in speed between the two wheels provides for a differential or "tank" style steering method. The wheels are typically not allowed to reverse, the speed ratio between the wheels is limited, and side to side movement of the lamination front is prevented during steering so that all sections of the web are kept in tension and very little shear is applied to the web in. order to prevent wrinkling. A laser line is projected on to the floor in front of the machine. This line is positioned to correspond to the edge of the film as it travels through the machine. The operator positions this line along the appropriate path on the floor to dictate where the edge of the current lamination will fall.

In one possible method for laminating the film, the film to be applied is contained in a roll which is supported on an unwind shaft that is coupled with a braking system used to control tension in the film as it is being applied. The film and liner, if present, are threaded from the unwind roll through a pivoting dancer assembly that is used to indicate and regulate the tension in the film and liner. Disturbances in the web tension or unwind speed cause the spring loaded dancer to move in one direction or another either taking up or letting out web length to maintain the set tension. A potentiometer can be fastened to the end of the dancer pivot shaft to read the position of the dancer and a feedback control system may be used to regulate the brake to maintain the dancer in a mid-stroke position. The film and liner then travel downward to a set of two rolls positioned as close as possible to the floor. Here, the liner, if present, is typically separated from the film and travels in a first direction toward a driven rewind roll. The film travels in an opposing second direction nearly parallel with the floor until it is captured between the floor and a following force loaded roll or other device which applies sufficient pressure to the film to fully wet the adhesive to the surface of the floor.

The floor to be laminated is typically thoroughly cleaned before application, and a final dusting is completed directly before the film is applied to each area. The film can be applied in parallel paths generally aligned with the longest direction of a given floor. Once the initial strip has been laid, the film can be manually cut, the machine realigned for the next strip, and the film tabbed to the floor. A manually handheld device may be used to adhere any areas of the film that the machine was unable to sufficiently laminate. The next strip can then be laid adjacent to the first with the edge of the second strip overlapping the edge of the first by a controlled margin. This procedure is repeated until the designated area has film applied.

After the area has been covered, each area may then be inspected for trouble spots. The film may be manually laminated, trimmed, or possibly stripped and reapplied with the machine if large areas are involved or by hand if only small patchwork is required.

Further features and advantages of this invention are further illustrated by the following examples, which are in no way intended to be limiting thereof. The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

Materials
EBECRYL® 8301 (hexafunctional acrylate) available from Radcure UCB Chemicals, Smyrna, Ga.
EBECRYL® 8402 (difunctional urethane acrylate) available from Radcure UCB Chemicals, Smyrna, Ga.
SURLYN® 1705 (ionomeric blend) available from E. I. du Pont de Nemours and Company, Wilmington, Del.
SURLYN® 1706 (ionomeric blend) available from E. I. du Pont de Nemours and Company, Wilmington, Del.
A174 (multifunctional silane) is available from OSI Specialties, Friendly, W. Va. Polyethylene terephthalate (PET) Mitsubishi 4507 series available from Mitsubishi, Greer, S.C.
TOPLINE® floor finish available from 3M Company, St. Paul, Minn.
SCLARL 150® SCOTCHSHIELD® Ultra SAFETY AND SECURITY WINDOW FILM (2 mil PET hardcoated with hydantoin hexactylate 2.5 µm) available from 3M Company, St. Paul, Minn.
Ethyl acetate is available from Aldrich Chemical Co, Milwaukee, Wis.
BOPP (biaxially oriented polypropylene) is available from Surface Specialties UCB, Wigton, Cumbria, UK
SBOPP (simultaneously biaxially oriented polypropylene) was prepared from BOPP using the techniques described in WO 9929794.
NALCO® 1042 silica sol (20 nm particles, 34.7% w/w silica; 1388 gm silica) available from Nalco Chemical Co, Naperville, Ill.
SPANGLE® floor finish available from 3M Company, St. Paul, Minn.
IRGACURE® 184 (photoinitiator) available from Ciba Specialties, Basel, Switzerland.
SR444 (pentaerythritol triacrylate) is available from Sartomer Co., West Chester, Pa.
TINUVIN 292 (liquid hindered-amine light stabilizer) available from Ciba Specialty Chemicals, Inc., Terrytown, N.Y.
TegoRad 2100 (crosslinkable flow and wetting additive) available from Degussa, Hopewell, Va.
DC31 available from Dow Corning, Midland, Mich.

Methods
Soiling Test
In the soiling test, a 1 ft$^2$ tile was covered with the film to be tested. A loop nylon kitchen style carpet was attached to the roller of the soiling machine. 2 grams of CSMA soil (Rohm & Haas, Philadelphia, Pa.) were placed on the carpet. After 25 cycles, the excess soil was removed and the machine was run for 500 cycles. At 500 cycles 1 more gram of standard soil was added and the machine run for 25 more cycles, the excess soil was brushed off and the machine was run for a total of 1000 cycles. A visual rating was given in terms of soiling of the finish. The rating scale went from 1 to 6, with 6 being best.

Taber Abrasion Test
Taber abrasion was done using a CS-10 wheel with a 500 gram load. The change in % haze was measured before abrading and after abrading for a specified amount of cycles. Specific materials used were: Sand Paper: Abraser Resurfacing Discs Cat. No. S-11 from Taber Industries; Wheels: Calibrase CS-10 from Taber Industries; TABER® Machine: Taber Industries 5150 Abraser; Haze reading machine: BYK Gardner Haze Guard Plus Cat. No. 4725.

Sand Traffic Test
A sand traffic test was done to study wear and durability of different film constructions. In this test, human subjects with varying size and footwear stepped on a wet sponge, then stepped on sand and finally stepped on the film. Gloss measurements at 60° were taken at: 0, 60, 120, 300, 450, 770, 1110, 1590 and 2050 cycles with a glossmeter micro-TRI-gloss available from BYK Gardner (Columbia, Md.). One cycle is equal to two steps on the sponge, sand and film taken by one subject.

The test patches for the sand traffic test were nominally two feet by three feet. A roller depicted in FIG. 5 of U.S. patent application Ser. No. 11/576,956, entitled "Film Lamination Vehicles and Method", filed on even date herewith (Oct. 12, 2004), covered with a one inch covering of 20 Shore A polyurethane to an outside diameter of three inches was used to apply lamination pressure. The roll was loaded by a framework with lead bricks providing approximately five pounds per lineal inch of the roll. The roll was manually pushed along the floor at a rate of approximately ten feet per minute. The film was continuously supplied at a minimal tension from a spindle mounted on the framework. Two strips of more than three feet are laid side by side on a clean and dust free floor such that a sufficient length of fully conformed and wrinkle free lamination was achieved. The second of the two strips was aligned to the first such that one edge of the second strip overlaps an edge of the first strip by approximately one half inch. The strips were then trimmed on the ends with a razor to leave a two-foot by three-foot area of good lamination for the test area. The outside edges of the test area were covered with a two-inch wide strip of vinyl tape to indicate the boundaries of the test patch as well as prevent the edges from lifting during the traffic test.

Black Mark Resistance Test
In the black mark resistance test films were laminated to 12"×12" vinyl composite tiles (VCT) and placed on a "snell capsule". The snell capsule is a hexagonal closed capsule along with six black rubber cubes that rotates. After the machine was rotated 2.5 minutes in each direction, the tiles are removed and inspected. A visual rating of 1 to 5 was given where 1 is poor and 5 is best. The control finish (3M SPANGLE® floor finish) was given a rating of 3 (comparing to floor finish control samples).

Nitrogen-Corona Treatment I

A biaxially oriented polypropylene (PP) film was held in contact with a 25-cm diameter, 50-cm face-width steel ground roll coated with a 2.0-mm thick layer of American Roller (Union Grove, Wis.) # CL500 ceramic dielectric. In this so-called "covered-roll" electrode configuration, the powered electrode consisted of two 200 cm$^2$, 33-cm face-width stainless steel "shoes" separated from the ground roll by an electrode gap of 1.5 mm. The treater housing was continually flushed with ca. 900 liters/min of cryogenically derived nitrogen gas, which maintained the concentration of molecular oxygen in the treater at <10 ppm and the concentration of water vapor at <100 ppm. The normalized corona energy was fixed at 1.7 J/cm$^2$, which corresponds to a corona power of 1400 W and a film speed of 15 m/min.

Nitrogen-Corona Treatment II

A biaxially oriented polypropylene (PP), film was held in contact with a 25-cm diameter, 50-cm face-width stainless steel ground roll. In this so-called "bare-roll" electrode configuration, the powered electrode consisted of two 2.4-cm-diameter, 46-cm long fluid-cooled ceramic tubes, which have a conductive metal core for the transmission of the power to the corona. The powered ceramic-tube electrodes were separated from the ground roll by an electrode gap of 1.5 mm. The normalized energy was still fixed at 1.7 J/cm$^2$, which for this electrode configuration corresponds to a corona power of 1960 W and a film speed of 15 m/min.

Nitrogen-Corona Treatment at Elevated Film Temperature

PP film was treated in an identical fashion described above except that the temperature of the ceramic-covered steel ground roll was controlled to 93° C. by a 240 L/min recirculating flow of water that was supplied by a "STERLCO®" (Sterling Engineering Co, Milwaukee, Wis.) temperature-control system.

Air-Corona Treatment

The air-corona treatment was identical to the Nitrogen Corona Treatment I, described above, except that instead of a substantially nitrogen atmosphere, air at 28% RH was used as the gas in the discharge.

Flame Treatment

Dust-filtered, 25° C. compressed air with a dew point of <−20° C. was premixed with the natural gas fuel in a venturi mixer located upstream of a 30 cm×1 cm ribbon burner supplied by the Flynn Burner Corporation (New Rochelle, N.Y.). The natural gas had a specific gravity of 0.577, a stoichiometric ratio with air of 9.6:1, and an average heat content of 37.8 kJ/L. The normalized flame power used was 400 W/cm$^2$ of burner surface area. At this normalized flame power, the tips of the luminous flame cones were ca. 3 mm above the topmost surface of the ribbon burner and ca. 3 mm from the surface of the PP film. The burner was mounted beneath a 25-cm diameter, 40-cm face-width steel chill roll coated with a ceramic material and water-cooled to 30° C. The PP film was transported around this chill roll and through the flame at a speed of 170 m/min. The PP film was treated at an equivalence ratio of 0.95, which corresponds to a volumetric air:fuel ratio of 10.1:1.

2 Bond Failure Test

The #2 Bond Failure test was performed substantially as described in WO 9811154A. This procedure was used to measure the force necessary to remove a adhesive coating from its backing. Test samples were cut into 1 inch wide by 8 inches long strips, and laminated onto anodized aluminum plates with a 4.5 lb roller. These laminates were then dwelled for at least 20 minutes, ideally overnight, at 23° C./50% RH. Peel adhesion test was conducted on a IMASS SP-2000 Peel Tester (commercially available from IMASS Inc., Accord, Mass.). The peel speed was 12 inch/minute, and peel angle was 90 degree. The force was reported in oz./inch. Apparatus conditions were as follow: average time of 5 sec, speed select switch to SL, scale in oz, calibrated at 0 and 67.0 oz. An average of 3 replicates is reported.

Examples 1-9

Conformable wear layer compositions having the components set forth in Table 1 were prepared and formed into samples. The functionalized (surface modified) silica nanoparticles used in these compositions were formed by the following method: 5.1 grams (gm) of ammonium fluoride was dissolved in 20 gm water. A 12-liter resin flask was equipped with a reflux condenser and mechanical stirring (pitched turbine blade on the end of a stainless steel shaft). It was then charged with 4000 gm of NALCO® 1042 silica sol (20 nm particles, 34.7% w/w silica; 1388 gm silica), 3600 gm ethyl acetate, 346 gm methacryloyloxypropyl (trimethoxy)silane, 400 gm more ethyl acetate (used to rinse the silane addition flask into the reaction flask). The aqueous ammonium fluoride solution was added to the reaction flask and stirring immediately started. An additional 20 gm water was used to rinse the ammonium fluoride addition flask into the reaction flask. The reaction was heated with a heating mantle. Roughly 5-10 minutes past ammonium fluoride addition, the reaction mixture began to form a gel, then white solids. After 20 minutes, there was a freely stirring white mixture in the reaction flask. The reaction was stirred at reflux for 20 hours, then ambiently cooled for 2 hours. 1000 gm sodium chloride was added and the mixture stirred for 45 minutes. Stirring halted, phases allowed to separate. The ethyl acetate phase was collected, dried with magnesium sulfate, then filtered to give 3975 gm of 29.0% w/w functionalized silica in ethyl acetate (% solids determined by oven drying at 150 degrees Celsius, for an hour). This ethyl acetate dispersion had a bluish opalescence.

TABLE 1

Conformable wear layer formulations (grams of each component)

| Formulation: | H1 | H2 |
|---|---|---|
| 8301 | 0 | 1.5 |
| 8402 | 4.2 | 1.5 |
| Particles | 1.6 | 5.5 |
| EA | 4.2 | 1.5 |
| Irgacure | 0.2 | 0.2 |

8301 refers to EBECRYL® 8301
8402 refers to EBECRYL® 8402
Particles refer to Functionalized (Surface Modified) Silica Nanoparticles described above
EA refers to Ethyl acetate
Irgacure refers to IRGACURE® 184

A stiff wear layer composition, designated herein as H3, was prepared as follows: In a round-bottomed flask were mixed 1195 grams NALCO® 2327 silica sol, commercially available from Nalco Chemical Co. (an ammonium ion-stabilized dispersion having a pH of 9.3 of colloidal silica particles, 40 percent solids, with an average particle diameter of 20 nanometers); 118 grams N,N-dimethyl acrylamide, commercially available from Aldrich Chemical Co; 120 grams 3-(trimethoxysilyl)propyl methacrylate coupling agent (A174), and 761 grams pentaerythritol triacrylate (SR444.) The round-bottomed flask was subsequently mounted on the vacuum line of a Buchi R152 Rotavapor, commercially available from Buchi Laboratory AG, Flanil, Switzerland with the bath temperature set to 55° C. A refrigerated mixture of 50 percent deionized water/50 percent antifreeze, was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition). The Carl Fisher analysis of this ceramer composition indicated that the residual water in the composition is less than 1.5 percent by weight relative to the total weight of the composition. To this mixture was added 1282 grams of isopropanol, 87 grams of water, 29 grams of TINUVIN 292, and 36 grams of Irgacure 184. The final composition has is ~50% solids and is amber to hazy in appearance.

Each of the conformable wear layers (H1 and H2) as well as the stiff wear layer (H3) was coated over two different conformable backings (blowfilm extrusion of SURLYN® 1705 and SURLYN® 1706) and a stiff backing (PET) as described below, thus providing a series of film constructions having the following film/wear layer combinations: stiff/stiff; stiff/conformable, conformable/stiff and conformable/conformable. All of the different film constructs prepared are summarized in Table 2.

For the coating step, the wear layer solution was diluted in solvent and coated onto the primed/corona-treated backing using a reverse gravure transfer coating. From the base formulation, H3 was diluted with a blend of 50/50 MEK/toluene and D5 was diluted with pure ethyl acetate. Target dilution was anywhere between 49% (undiluted) to 33% solids by weight, depending on desired final thickness. For the target coating thickness of 5 microns, a 4.75" diameter gravure roll with a 55 lines/inch ruling mill pattern and a volume factor of 49.5 cbm/sq. in was used. After coating, material was passed through a convection oven set at 50° C. and then a Fusion UV-cure chamber holding a single 400 W/in H-bulb at full intensity. All coating occurred between 5 and 10 m/min, most preferably at 10 m/min. Although gravure rolls were chosen for ease of operation, extrusion die and enclosed knife manifold systems were also demonstrated with equally good performance.

TABLE 2

Film Constructions.

| Film Construction # | Wear Layer | Backing |
|---|---|---|
| E1 | H1 (conformable) | SURLYN ® 1705 (conformable) |
| E2 | H1 (conformable) | SURLYN ® 1706 (conformable) |
| E3 | H1 (conformable) | PET (stiff) |
| E4 | H2 (conformable) | SURLYN ® 1705 (conformable) |
| E5 | H2 (conformable) | SURLYN ® 1706 (conformable) |
| E6 | H2 (conformable) | PET (stiff) |
| E7 | H3 (stiff) | SURLYN ® 1705 (conformable) |
| E8 | H3 (stiff) | SURLYN ® 1706 (conformable) |
| E9 | H3 (stiff) | PET (stiff) |

The film constructions were also coated with an adhesive and applied to a floor substrate. The adhesive material was coated onto silicone-coated release liner paper from a solvent solution at 41-45% solids (see description of adhesive A2 below) using a flat-bed notch bar coater (also called a comma or bull-nose coater). To achieve a coat weight of 2.0 mils dry thickness, a notch bar gap of 6 mils was used, as set by feeler gauges. After coating, material was passed through a 36-fl convection oven divided into three equal zones set at 130, 140, and 200° F. with each oven zone getting progressively warmer. Immediately after drying, the adhesive-coated side of the release liner was laminated to the uncoated side of the wear layer-coated backing. Lamination was accomplished between a metal roll and a pneumatically-actuated rubber roll. Again, while the notch bar was chosen for ease of operation, other methods, such as, for example, an enclosed, pre-metered system such as a slot-fed knife die, could alternatively be used. After adhesive coating and lamination, the material was slit to remove the uncoated edges.

Figure 2:
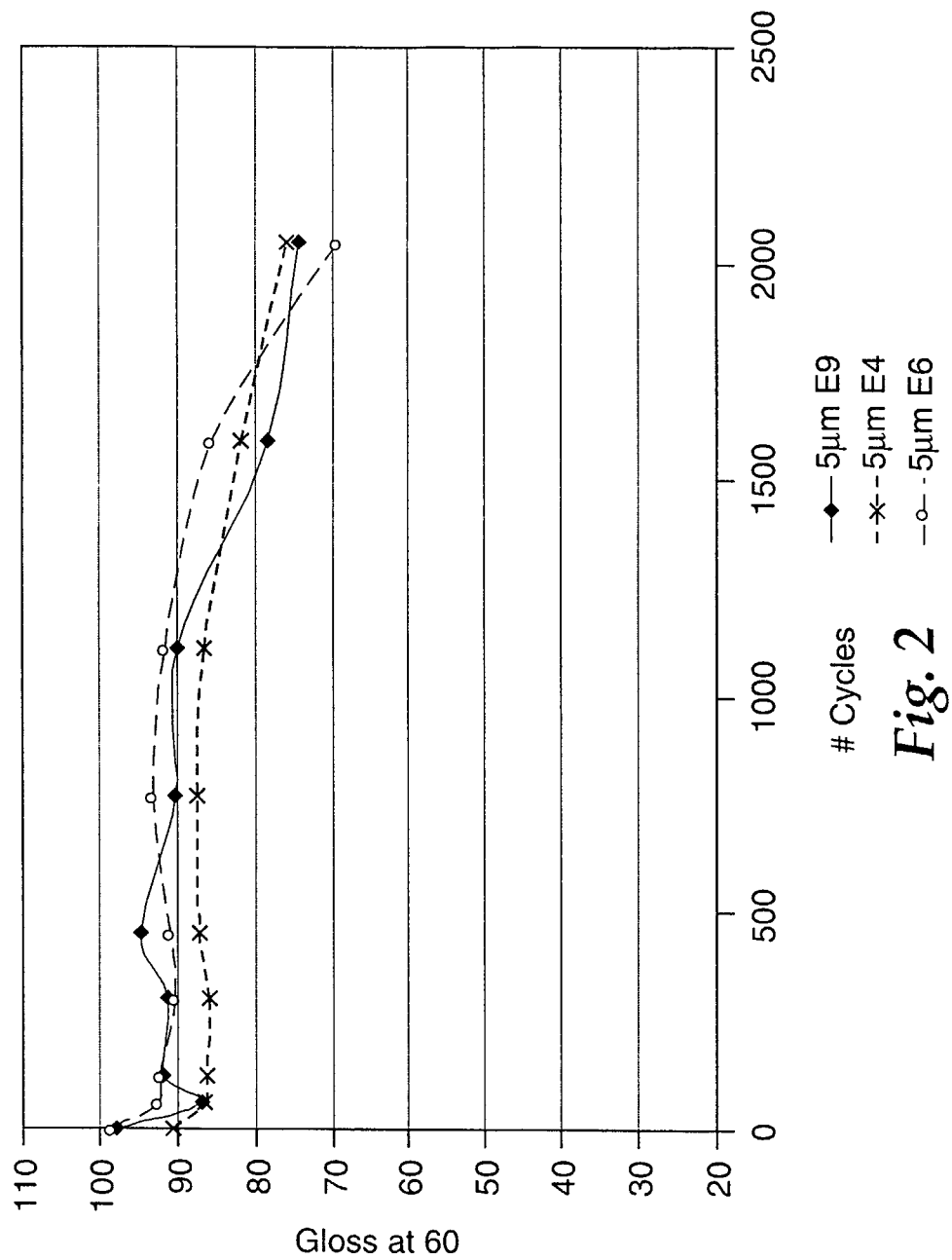
FIG. 2 is a graph showing the results of traffic tests performed with various high gloss floor film constructions.
Figure 3:
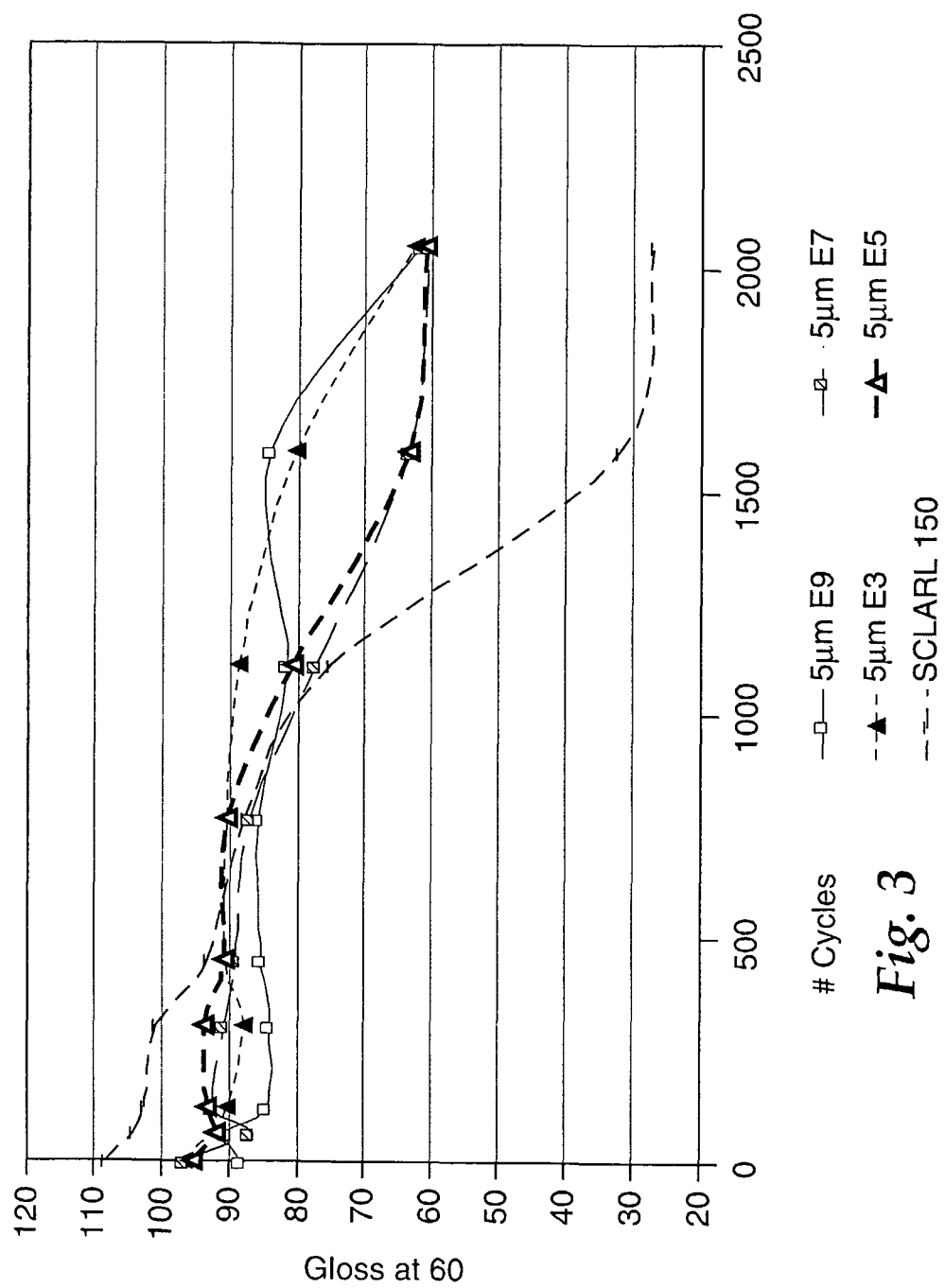
FIG. 3 is a graph showing the results of traffic tests performed with various low gloss floor film constructions.
Figure 4:
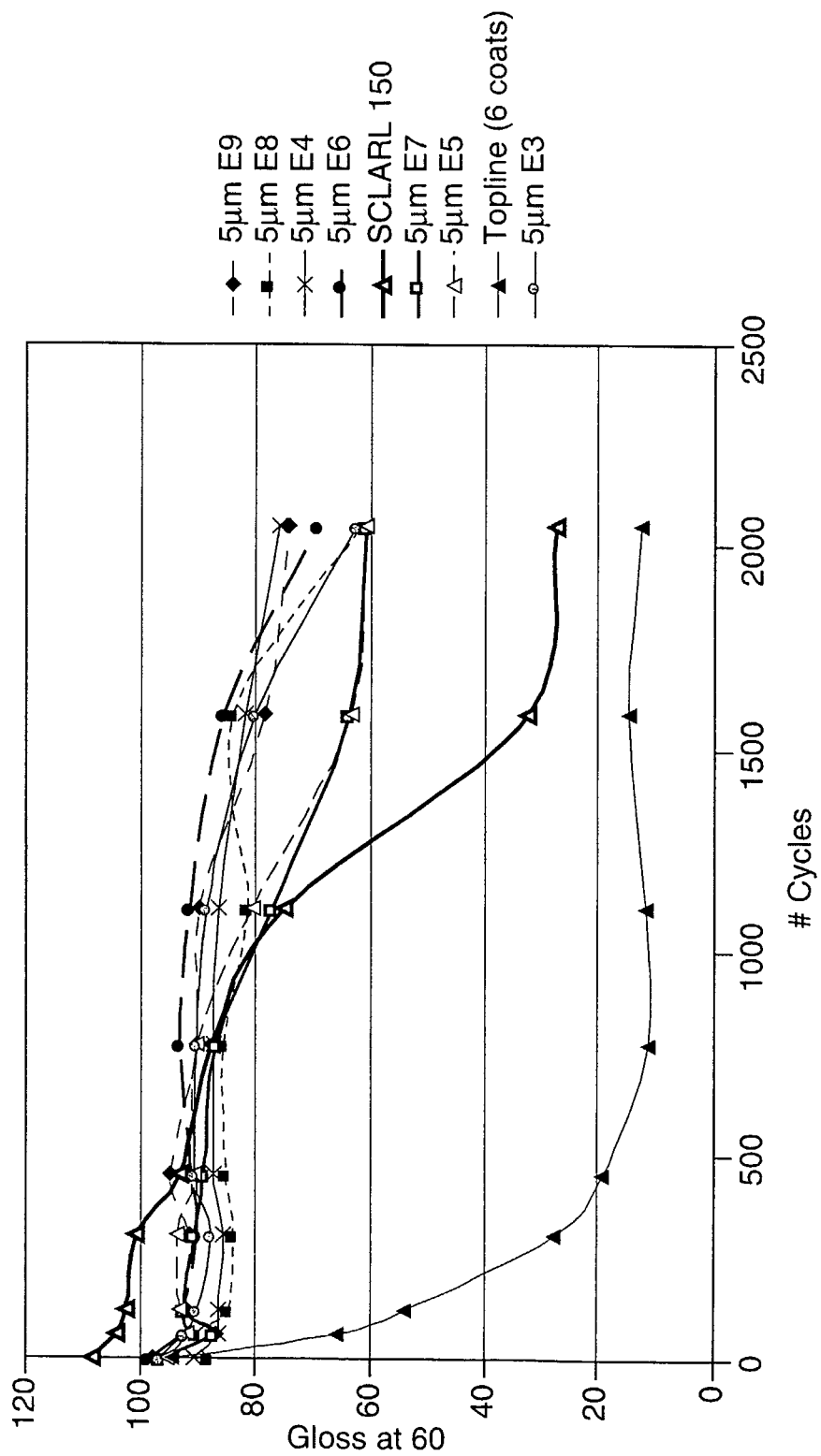
FIG. 4 is a graph showing the results of traffic tests performed with various floor film constructions.

After lamination to the floor, each of the film constructions E1-E9, as well as a commercially available hardcoated window film available under the trade designation SCLARL 150®, were subjected to the sand traffic test. In addition, a floor finish product available under the trade designation "TOPLINE®" was tested with the sand traffic test. The results are presented in FIGS. 2-4. In general, films having a wear layer showed better gloss retention than conventional floor Finishes.

The following film constructions H1/PET (E3), H2/PET (E6), and H3/PET (E9) were prepared as described above and subjected to the black mark resistance test. The results are provided in Table 2, below. All of the wear layer coated films showed significantly better black mark resistance when compared to the best control finish (rating of 5). While the control tile with a rating of 3 showed black marks and scuff marks, the hardcoated films in general showed a much better appearance with fewer black marks and no scuff marks (rating>5).

TABLE 3

Results for Black Mark Resistance Test

| Film | Rating |
|---|---|
| Spangle Control 1 | 3 |
| Spangle Control 2 | 3 |
| E3 | >5 |
| E6 | >5 |
| E9 | >5 |

In addition, several of the film constructions (5 μm wear layer; 1 mil adhesive layer) were evaluated for soiling resistance, using the soiling test described above. A commercially available floor finish was also tested. Each sample was tested twice. The results are reported in Table 4.

TABLE 4

Results for Soiling Test

| Film | Soiling Rating #1 | Soiling Rating #2 |
|---|---|---|
| E9 | 2.5 | 2.5 |
| E8 | 2.5 | 2.5 |
| E3 | 1.0 | 1.0 |
| E6 | 2.5 | 2.5 |
| E5 | 2.0 | 2.0 |
| SPANGLE ® | <1 | <1 |

Examples 10-13

Surface Treatment Experiment

Figure 5:
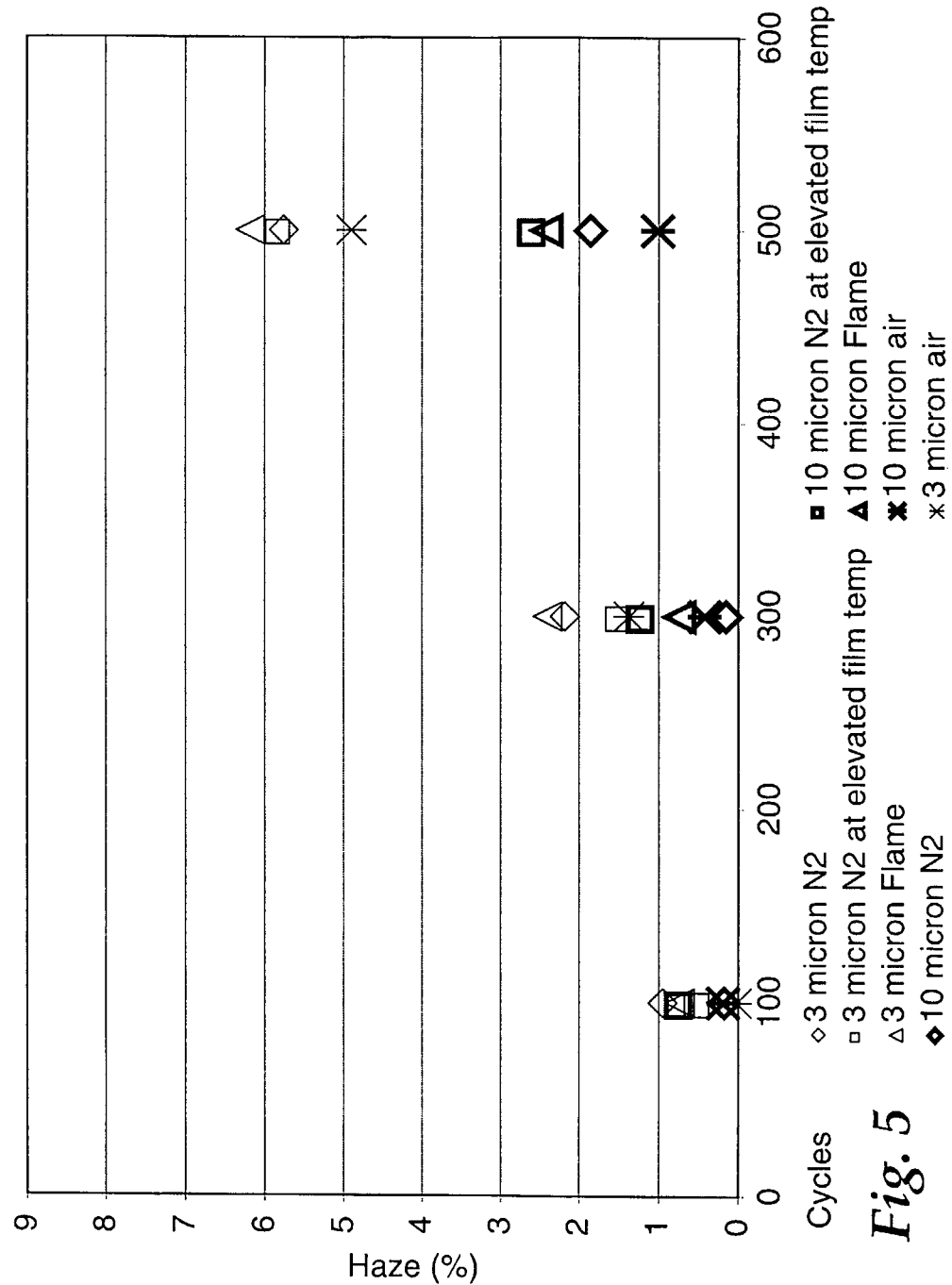
FIG. 5 is a graph showing the Taber abrasion resistance of surface treated BOPP.
Figure 6:
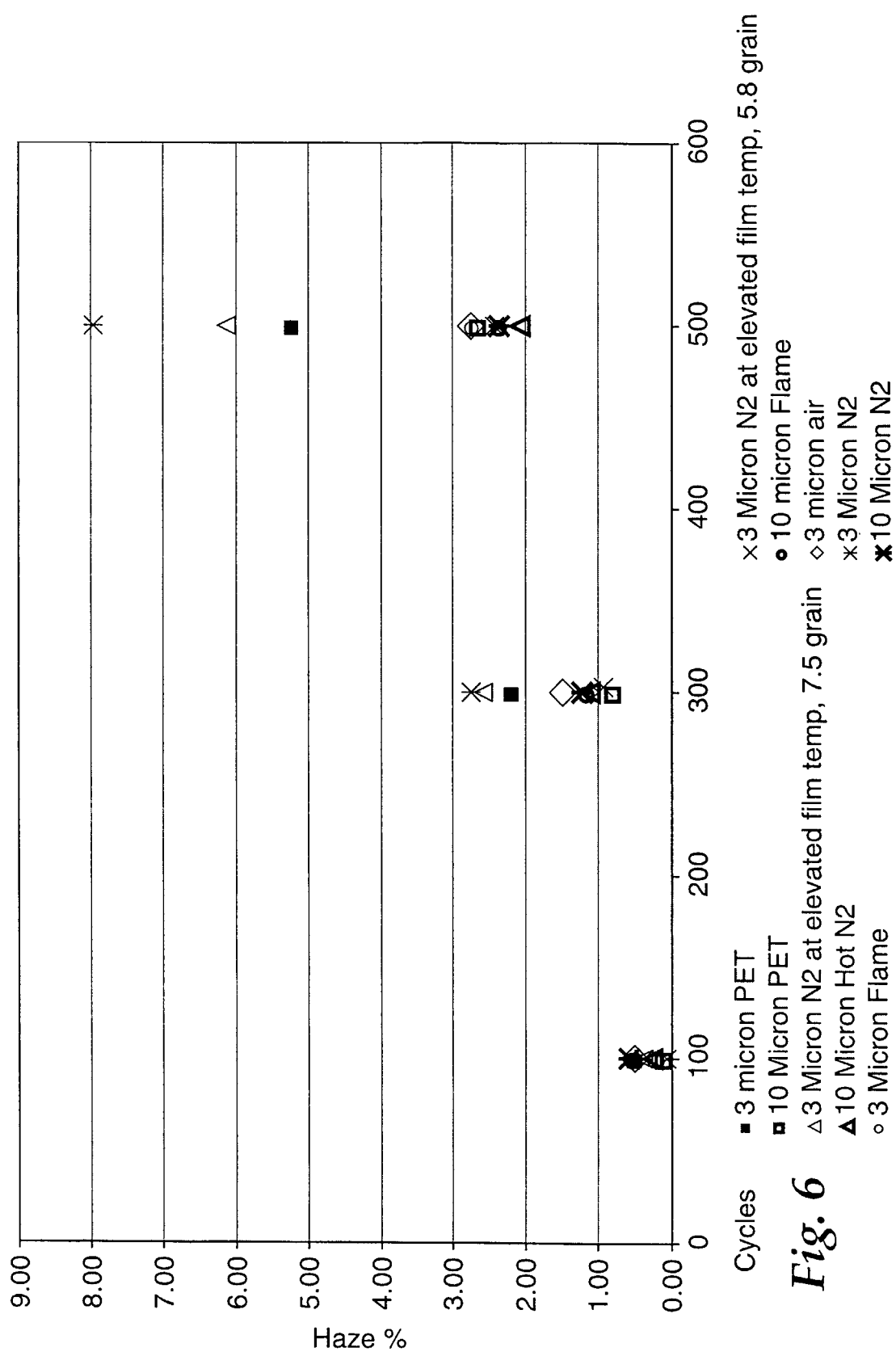
FIG. 6 is a graph showing the Taber abrasion resistance of surface treated SBOPP and PET.

A modified version of the H3 wear layer with a silicone acrylate was prepared as described in U.S. Pat. No. 6,461,709, and then coated on each of the following backings at thicknesses of 3 μm and 10 pin: PET with acrylic priming (E10), BOPP (E11), and SBOPP (E12). The BOPP and SBOPP backings were treated before coating with H3 with either nitrogen corona, nitrogen corona at elevated film temperature, flame or air corona. The various constructions were then subjected to the Taber abrasion test. The results for BOPP and SBOPP are shown in FIGS. 5 and 6, respectively.

2 bond failure testing was also done on the BOPP and SBOPP constructions with different surface treatments. The backings (2 mils) were coated with adhesive A1, which was prepared by mixing 100 parts of 90/10 2-methylbutylacrylate/acrylic acid adhesive (Low I.V.) with mixed 0.2 part bisamid cross-linker, as described in U.S. patent application Ser. No. 11/576,962, entitled "Protective Film Adhesive", filed on even date herewith (Oct. 12, 2004). Aging on the different treated samples was done in order to simulate the heat that the films will "see" during the wearcoating process. The results are provided in Table 5.

TABLE 5

Bond Failure of Adhesive on surface treated BOPP and SBOPP

| Film | Surface Treatment | Aging = 3 min 70 C., 1 min = 90 C. (Simulate 25 ft/min (15 ft oven); 70 C. & 90 C. (uv chamber) | #2 bond failure oz/inch, 90° peel 12 inch/min |
|---|---|---|---|
| E11 | Factory Corona | yes | 30.2 |
| | Air Corona | yes | 36.3 |
| | Nitrogen Corona I | yes | Film Broke |
| | Nitrogen Corona at elevated film temp | yes | Film Broke |
| | Plasma | yes | 1.7 |
| | Flame | yes | 36.3 |
| E12 | Factory Corona | yes | 28.4 |
| | Air Corona | yes | 44.2 |
| | Nitrogen Corona I | yes | 103.5* |
| | Nitrogen Corona at elevated film temp | yes | 91.3* |
| | Plasma | yes | 1.8 |
| | Flame | yes | 42.7 |
| E11 | Factory Corona | no | 26.3 |
| | Air Corona | no | 29.4 |
| | Nitrogen Corona I | no | Film Broke |
| | Nitrogen Corona at elevated film temp | no | Film Broke |
| | Plasma | no | 2.1 |
| | Flame | no | 32.8 |
| E12 | Factory Corona | no | 27.1 |
| | Air Corona | no | 36.5 |
| | Nitrogen Corona I | no | 93.0* |
| | Nitrogen Corona at elevated film temp | no | 94.7 |
| | Plasma | no | 2.1 |
| | Flame | no | 34.2 |

*5% adhesive residual on film

The results showed that surface treatment of the backing affects the adhesion of the adhesive layer and whether or not the adhesive has the right adhesion to the film. There were no significant differences in #2-bond failure between the aged and un-aged films. #2-bond failure is substantially affected by the surface treatment on the backing. Nitrogen corona and nitrogen corona at elevated film temperature surface treated films showed high values of #2-bond failure.

Corona Energy Level Experiment

Figure 7:
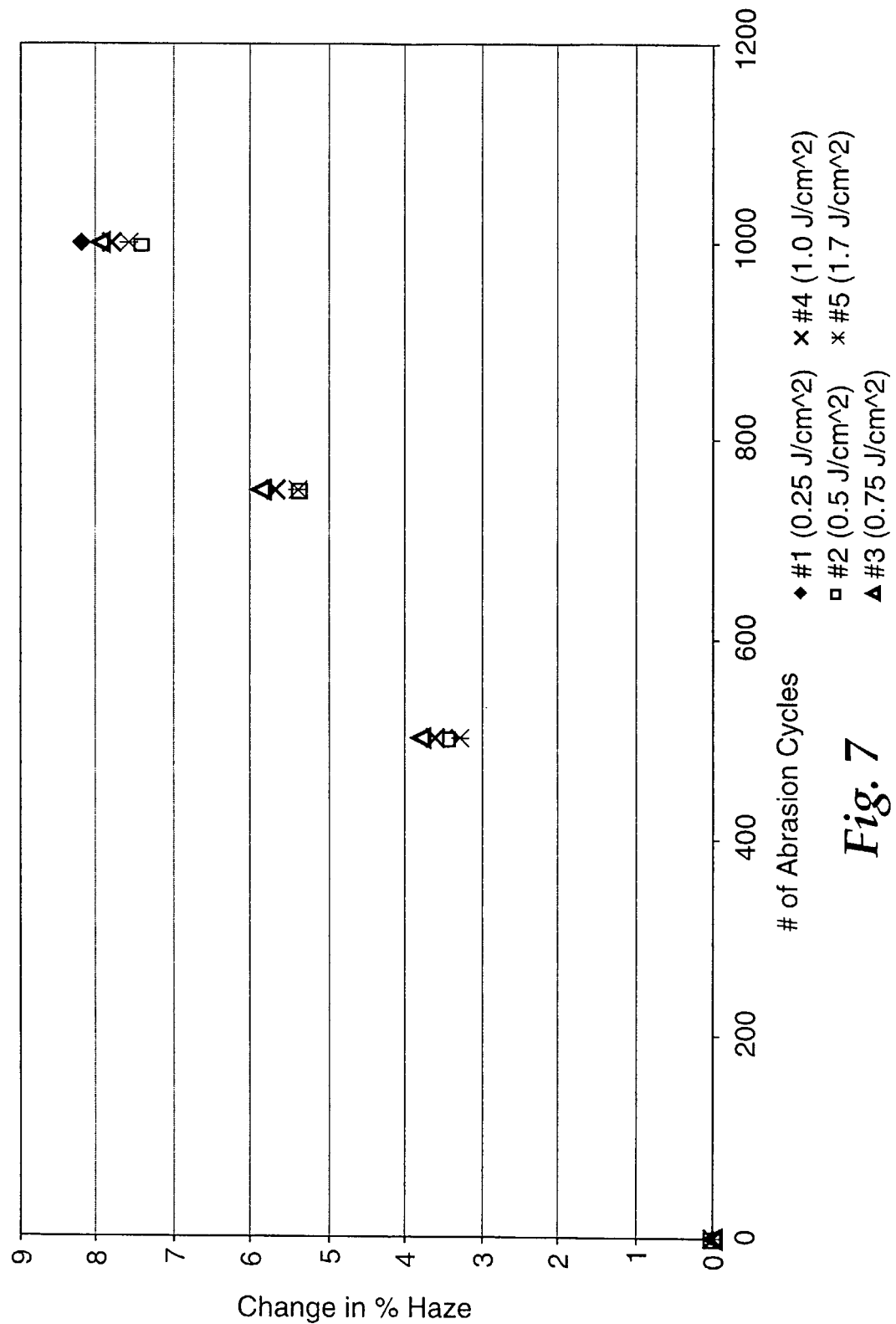
FIG. 7 is a graph showing the Taber abrasion resistance of BOPP films subjected to nitrogen corona treatment.
Figure 8:
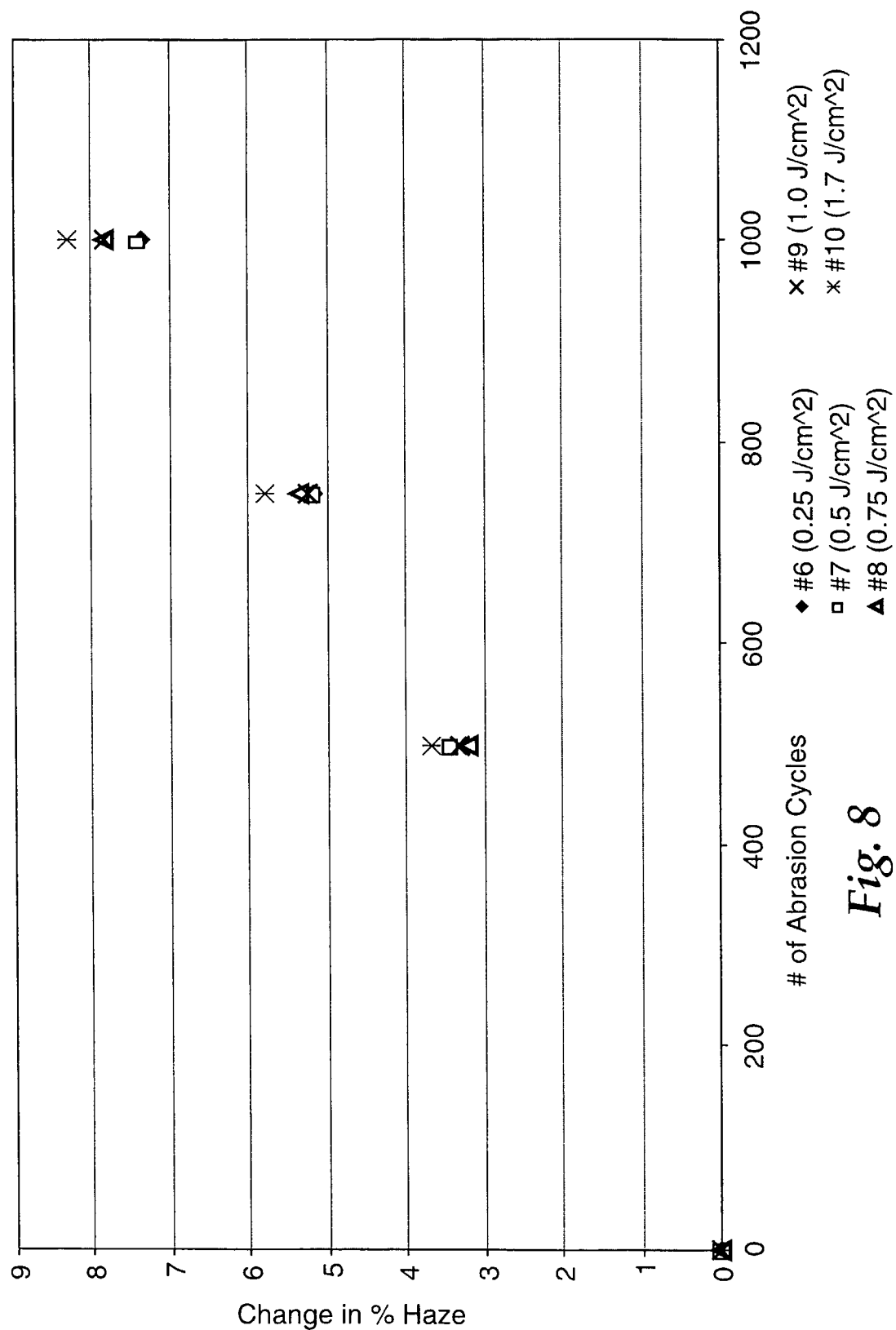
FIG. 8 is a graph showing the Taber resistance of SBOPP films subjected to nitrogen corona treatment.

The BOPP and SBOPP backings were treated with nitrogen corona treatment 11 as described above, with energy levels at 0.25, 0.5, 0.75, 1.0 and 1.7 J/cm$^2$, and coated with I-13. The adhesive, A2, was prepared as described in Example 3 of U.S. patent application Ser. No. 11/576,962, entitled "Protective Film Adhesive", filed on even date herewith (Oct. 12, 2004), and coated onto the film at 1 mil thickness with SCW-21 release liner. The samples were then subjected to the Taber abrasion test described above, the results on which are provided in FIGS. 7 and 8. As shown in these FIGs, no effect was observed of the surface energy level of the nitrogen-corona treatment on Taber abrasion resistance on BOPP and SBOPP.

The samples were also subjected to #2-bond failure test described above. The results are reported in Table 6, below.

TABLE 6

Results for #2-Bond Failure Test

| Film description | Average 2 bond (oz/inch) | % transfer |
|---|---|---|
| E11 - 0.25 J/cm$^2$ | 46.8 | 100 |
| E11 - 0.5 J/cm$^2$ | 45.7 | 100 |
| E11 - 0.75 J/cm$^2$ | 48 | 100 |
| E11 - 1.0 J/cm$^2$ | 69.1 | split |
| E11 - 1.7 J/cm$^2$ | 72.9 | split |
| E12 - 0.25 J/cm$^2$ | 42.6 | 100 |
| E12 - 0.5 J/cm$^2$ | 51.8 | 100 |
| E12 - 0.75 J/cm$^2$ | 49.4 | 100 |
| E12 - 1.0 J/cm$^2$ | 46.6 | 100 |
| E12 - 1.7 J/cm$^2$ | 50.1 | 100 |

These data demonstrate that the #2-Bond values and mode of failure were strongly dependant on the energy level of the nitrogen corona treatment. In general, the higher the energy level of the nitrogen corona treatment the higher the #2-bond value.

Effect of Silicone Additive on Soil Resistance

Samples of the H3 wear layer formulation described above were prepared with various silicone additives. H3 without additive was used as the control. The samples (10 micrometer dry thickness) were coated onto primed (with PVDC) PET (2 mil) using a #5 Meyer bar (R. D. Specialties, Webster, N.Y.) Curing was carried out using a UV Processor using medium pressure mercury lamps at about 200 to 240 mJ/cm$^2$, 50 ft/min, using a RPC UV processor (RPC Industries, Plainfield, Ill.), normal/normal settings, nitrogen purge. The cured samples were subjected to the soiling test in order to determine if the additives increased soil resistance. The results are reported below in Table 7.

TABLE 7

Soil resistance of wear layers containing silicone additives.

| Additive | Soiling Rating #1 | Soiling Rating #2 | Ave. Soiling Rating |
|---|---|---|---|
| Control (no additive) | 2 | 1 | 1.5 |
| 0.8 phr TegoRad 2100 | 5 | 5 | 5 |
| 0.8 phr Ebecryl 350 | 3 | 3 | 3 |
| 0.2 phr Ebecryl | 3 | 3 | 3 |
| 0.8 phr DC31 | 3 | 3 | 3 |
| 0.2 phr TegoRad 2100 | 5 | 4 | 4.5 |
| 0.2 phr DC31 | 3 | 3 | 3 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A protective floor film for protecting a top surface of a floor, the protective floor film comprising:
 a stretchable base film layer comprising a polymeric resin, wherein the base film layer has a thickness in a range of 1 to 10 mils; and
 a wear layer disposed on at least a portion of the base film layer, wherein the wear layer comprises surface modified silica particles having a mean diameter in the range from 1 to 200 nanometers;
 wherein the protective floor film is configured to retain 60%-85% of an initial gloss value at a 60° incident angle after 1,590 cycles of a Sand Traffic Test.

2. The protective floor film of claim 1 wherein the polymeric resin is selected from the group consisting of polypropylene, polyacetal, polyamide, polyester, polyolefin, polystyrene, polyvinyl chloride, polyvinylidene chloride, polyurethane, polyurea, an ionomeric blend, and polyethylene terephthalate.

3. The protective floor film of claim 1 wherein the wear layer comprises a UV cured hardcoat resin selected from the group consisting of polyacrylate and polyurethane acrylate.

4. The protective floor film of claim 1 wherein a surface of the base film layer facing the wear layer is corona treated.

5. The protective floor film of claim 1 wherein a primer layer is disposed between the base film layer and the wear layer.

6. The protective floor film of claim 1, wherein the base film layer is conformable and the wear layer is conformable.

7. The protective floor film of claim 1, wherein the wear layer further includes a fluorinated additive.

8. The protective floor film of claim 1 wherein the protective floor film is configured to retain 60%-80% of an initial gloss value at a 60° incident angle after 1,590 cycles of a Sand Traffic Test.

9. The protective floor film of claim 1, wherein the protective floor film is configured to retain 65%-85% of an initial gloss value at a 60° incident angle after 1,590 cycles of a Sand Traffic Test.

10. The protective floor film of claim 1 further comprising a pressure sensitive adhesive layer disposed on at least a portion of the base film layer opposite the wear layer.

11. The protective floor film of claim 10 further comprising a release liner disposed on at least a portion of the pressure sensitive adhesive layer opposite the base film layer.

12. The protective floor film of claim 10 wherein a surface of the base film layer facing the pressure sensitive adhesive layer is corona treated.

13. The protective floor film of claim 10 wherein a primer layer is disposed between the base film layer and the pressure sensitive adhesive layer.

14. A protective floor film for protecting a top surface of a floor, the protective floor film comprising:
 a base film layer comprising an ionomeric resin, wherein the base film layer has a thickness in a range of 1 to 10 mils;
 a wear layer disposed on at least a portion of the base film layer, wherein the wear layer comprises a UV cured hardcoat resin selected from the group consisting of polyacrylate and polyurethane acrylate, wherein the wear layer comprises surface modified silica particles having a mean diameter in the range from 1 to 200 nanometers; and
 a pressure sensitive adhesive layer disposed on at least a portion of the base film layer opposite the wear layer for removably adhering the protective floor film to the top surface of the floor.

15. The protective floor film of claim 14, further comprising a release liner disposed on at least a portion of the pressure sensitive adhesive layer opposite the base film layer.

16. The protective floor film of claim 14 wherein a surface of the base film layer facing the wear layer is corona treated.

17. The protective floor film of claim 14 wherein a primer layer is disposed between the base film layer and the wear layer.

18. The protective floor film of claim 14 wherein a surface of the base film layer facing the pressure sensitive adhesive layer is corona treated.

19. The protective floor film of claim 14 wherein a primer layer is disposed between the base film layer and the pressure sensitive adhesive layer.

20. A protective floor film for protecting a top surface of a floor, the protective floor film comprising:
 a base film layer comprising a polyethylene terephthalate resin, wherein the base film layer has a thickness in a range of 1 to 10 mils;
 a wear layer disposed on at least a portion of the base film layer for finishing the top surface of the floor, wherein the wear layer comprises a UV cured hardcoat resin selected from the group consisting of polyacrylate and polyurethane acrylate, wherein the wear layer comprises surface modified silica particles having a mean diameter in the range from 1 to 200 nanometers; and
 a pressure sensitive adhesive layer disposed on at least a portion of the base film layer opposite the wear layer for removably adhering the protective floor film to the top surface of the floor.

21. The protective floor film of claim 20, further comprising a release liner disposed on at least a portion of the pressure sensitive adhesive layer opposite the base film layer.

* * * * *

UNITED STATES PATENT AND TRADEMARK OFFICE
CERTIFICATE OF CORRECTION

PATENT NO. : 9,723,940 B2
APPLICATION NO. : 11/576961
DATED : August 8, 2017
INVENTOR(S) : Adriana Paiva et al.

Page 1 of 1

It is certified that error appears in the above-identified patent and that said Letters Patent is hereby corrected as shown below:

In the Specification

Column 2
Line 44, delete "filth" and insert -- film --, therefor.
Line 63, after ""a"" insert -- , --.

Column 5
Line 20, delete "in" and insert -- In --, therefor.

Column 6
Line 6 (Approx.), after "employed" insert -- . --.

Column 9
Line 52, delete "hexactylate" and insert -- hexacrylate --, therefor.
Line 57, after "UK" insert -- . --.

Column 10
Line 4, delete "Terrytown," and insert -- Tarrytown, --, therefor.

Column 12
Line 8, delete "oz./inch." and insert -- oz/inch. --, therefor.

Column 13
Line 2, delete "(A174)," and insert -- (A174); --, therefor.
Line 30, delete "comformable," and insert -- conformable, --, therefor.

Column 15
Line 7, delete "pin:" and insert -- μm: --, therefor.
Line 20 (Approx.), delete "bisamid" and insert -- bisamide --, therefor.

Signed and Sealed this
Tenth Day of July, 2018

Andrei Iancu
*Director of the United States Patent and Trademark Office*